United States Patent
Furuya et al.

(10) Patent No.: US 7,626,755 B2
(45) Date of Patent: Dec. 1, 2009

(54) WAVELENGTH CONVERTER AND TWO-DIMENSIONAL IMAGE DISPLAY DEVICE

(75) Inventors: Hiroyuki Furuya, Nara (JP); Kiminori Mizuuchi, Osaka (JP); Kazuhisa Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/022,616

(22) Filed: Jan. 30, 2008

(65) Prior Publication Data

US 2008/0212621 A1   Sep. 4, 2008

(30) Foreign Application Priority Data

Jan. 31, 2007   (JP) .............................. 2007-020831

(51) Int. Cl.
*G02F 1/35* (2006.01)
*G02F 2/02* (2006.01)
*H01S 3/30* (2006.01)

(52) U.S. Cl. .......................................... 359/326; 372/6
(58) Field of Classification Search ......... 359/326–332; 372/6
See application file for complete search history.

(56) References Cited

U.S. PATENT DOCUMENTS

| 6,259,552 | B1 * | 7/2001 | Boffi et al. ................... 359/332 |
| 6,347,174 | B1 * | 2/2002 | Onishi et al. ................ 385/122 |
| 6,459,068 | B1 | 10/2002 | Yamaura et al. |
| 6,567,600 | B2 * | 5/2003 | Yoshida ....................... 385/134 |

FOREIGN PATENT DOCUMENTS

| JP | 2888157 | 2/1999 |
| JP | 2001-156363 | 6/2001 |
| JP | 2004-356421 | 12/2004 |

* cited by examiner

*Primary Examiner*—Daniel Petkovsek
(74) *Attorney, Agent, or Firm*—Wenderoth, Lind & Ponack, L.L.P.

(57) ABSTRACT

A wavelength converter of the present invention is provided with a laser resonator including a fiber containing an laser-active material and a fiber grating formed in the fiber, a laser light source for emitting an excitation light to the fiber, and a wavelength conversion element for converting a fundamental wave of a laser beam emitted from the laser resonator into a harmonic, wherein the fiber is coiled and has the outer side thereof coated with a heat radiating member having a reflection surface for reflecting light having a wavelength of an excitation light. The wavelength converter is designed to prevent an efficiency reduction caused by the heat generation of a rare-earth doped fiber in a wavelength converter.

19 Claims, 13 Drawing Sheets

WAVELENGTH CONVERTER AND TWO-DIMENSIONAL IMAGE DISPLAY DEVICE

BACKGROUND OF THE INVENTION

1. Field of the Invention

The present invention relates to a wavelength converter capable of obtaining a stable high output visible light laser beam by combining a fiber laser and a wavelength conversion element, and a two-dimensional (2D) image display device using this wavelength converter as a light source.

2. Description of the Background Art

A visible light source capable of emitting a highly monochromatic W-class high output is being required to realize large-size displays, high-luminance displays, etc. High-output red semiconductor lasers used in DVD recorders and the like can be utilized as small-size light sources having high productivity for red light out of three primary colors of red, green and blue. For green and blue light sources, however, realization by semiconductor lasers and the like is difficult and small-size light sources having high productivity are still asked for. Above all, it is highly difficult to realize green light sources since there is no material suitably usable for semiconductor lasers to obtain green output beams.

Wavelength converters as combinations of fiber lasers and wavelength conversion elements are realized as low-output visible light sources. The visible light source includes a semiconductor laser as a light source for excitation light for exciting the fiber laser and a nonlinear optical crystal as the wavelength conversion element, and is well-known as a small-size light source for green or blue light.

However, several problems need to be solved in order to obtain W-class high-output green and blue beams using such a wavelength converter. For example, in the case of obtaining a green output beam using the construction of a conventional wavelength converter, the wavelength converter needs to include a fiber laser for outputting a fundamental wave, a wavelength conversion element for converting the fundamental wave into a green laser beam and a lens for condensing an output of the fundamental wave to an end surface of the wavelength conversion element.

A basic laser operation of this fiber laser is further described. First, an excitation light from an excitation laser light source is incident on one end of a fiber. The excitation light incident on the fiber is absorbed by a laser-active material contained in the fiber and, thereafter, a seed light of the fundamental wave is generated in the fiber. This seed light of the fundamental wave reciprocates by being reflected many times in a resonator using a fiber grating formed in the fiber and a fiber grating of another fiber as a pair of reflection mirrors. Simultaneously, the seed light is amplified by a gain by the laser-active material contained in the fiber to increase its light intensity and to have a wavelength selected, thereby reaching a laser oscillation. It should be noted that the two fibers are connected by a connecting portion and the laser light source is current-driven by a laser current source for excitation.

Next, a basic operation of the wavelength converter is described. The fundamental wave is outputted by the fiber laser as described above to be incident on the wavelength conversion element via the lens. This fundamental wave from the fiber laser is converted into a harmonic by the nonlinear optical effect of the wavelength conversion element. The converted harmonic is partly reflected by a beam splitter, but the other part having passed through the beam splitter becomes a green laser beam as an output beam of the wavelength converter.

The harmonic partly reflected by the beam splitter is utilized by being converted into an electrical signal after being received by a light receiving element for the monitoring of the output beam from the wavelength converter. An output controller regulates a drive current of the laser light source by means of a laser current source for excitation so that the intensity of the converted signal becomes an intensity to give a desired output in the wavelength converter. Then, the intensity of the excitation light from the laser light source is regulated and the output intensity of the fundamental wave from the fiber laser is regulated, with the result that the output intensity of the wavelength converter is regulated. In this way, a so-called automatic power control (hereinafter, abbreviated as "APC"), in which the output intensity of the wavelength converter is kept constant, is stably performed.

In order to obtain a W-class high-output green laser beam, i.e. in order to increase the light output of the wavelength converter by such a construction, the fundamental wave of the fiber laser and the output of the excitation light need to be increased. On the other hand, since the fiber laser is formed to have a narrow and long shape by a laser medium and has a large surface area, it is originally formed to easily radiate heat generated thereby, but it is known that the efficiency of the fiber laser decreases by the heat generation of the rare-earth doped fiber if the fundamental wave and the output of the excitation light are increased. In order to prevent such an efficiency reduction of the fiber laser, there have been conventionally proposed a method for improving heat radiation by winding a fiber around a metallic reel (see, for example, Japanese Unexamined Patent Publication No. 2004-356421) and the like. On the other hand, there has been also proposed a method for retaining a rare-earth fiber in an adhesive film (see, for example, the specification of Japanese Patent No. 2888157) in order to facilitate the handling of the rare-earth doped fiber in the fiber laser whose output is in the level of several hundreds mW. A construction for not causing excitation at a fiber end face (see, for example, Japanese Unexamined Patent Publication No. 2001-156363) has been also proposed.

However, in a fiber laser light source in which the output of a fundamental wave exceeds 7 W, it has been difficult to efficiently radiate heat generated by a fiber and to improve a conversion efficiency from an excitation light to an emission light. In the case of using a metallic reel as in the prior art, there have been problems of higher parts cost and production cost and difficult miniaturization. On the other hand, it may be thought to arrange the fibers in such a manner as not to overlap each other for better heat radiation. However, this makes the handling more difficult and requires a larger space, thereby presenting a problem of difficult miniaturization.

SUMMARY OF THE INVENTION

In order to solve the above contradicting problems, an object of the present invention is to provide a wavelength converter capable of stably obtaining W-class high-output green and blue laser beams and a high-luminance 2D image display device using this wavelength converter.

In order to accomplish the above object, the present invention is directed to a wavelength converter, comprising a fiber laser resonator including a fiber containing a laser-active material and a fiber grating formed in the fiber; a laser light source for emitting an excitation light to the fiber; and a wavelength conversion element for converting a fundamental wave of a laser beam emitted from the fiber laser resonator into a harmonic, wherein the fiber containing the laser-active material is coiled; and at least a part of the outer surface of the fiber has a reflection surface for reflecting light having the wavelength of the excitation light and is covered by a heat radiating member capable of radiating heat generated by the fiber.

According to the present invention, there can be obtained a wavelength converter capable of stably obtaining W-class green and blue laser beams having high outputs.

In order to accomplish the above object, a 2D image display device of the present invention comprises the above wavelength converter and a mechanism for controlling a light quantity in accordance with the luminance information of an inputted video signal, wherein an average light quantity is controlled by applying a PWM control to the light source.

According to the present invention, there can be obtained a 2D image display device capable of stably obtaining W-class green and blue laser beams having high outputs.

These and other objects, features, aspects and advantages of the present invention will become more apparent upon a reading of the following detailed description with reference to accompanying drawings.

DETAILED DESCRIPTION OF THE PREFERRED EMBODIMENTS OF THE INVENTION

Figure 1:
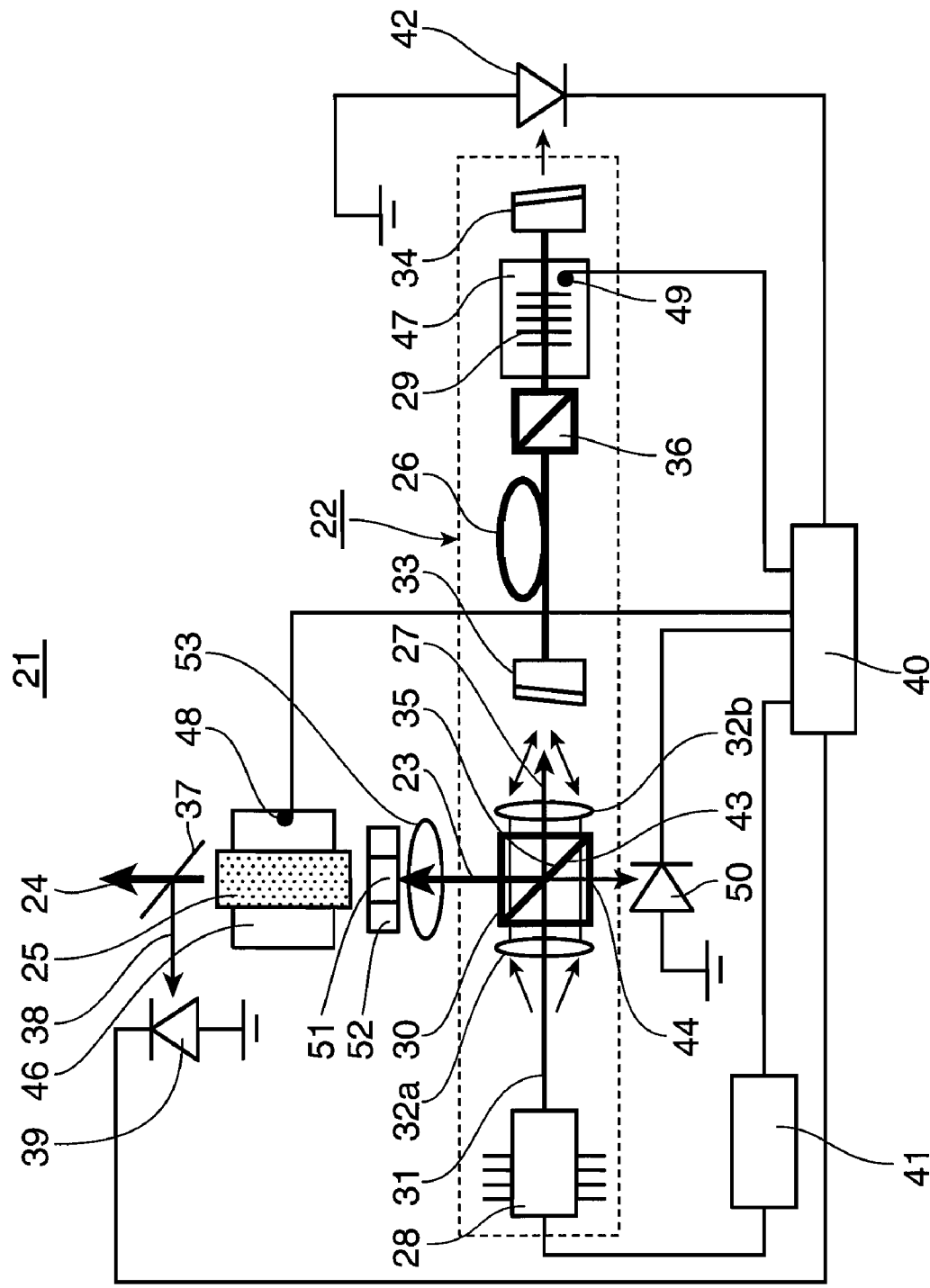
FIG. 1 is a schematic construction diagram of a wavelength converter according to a first embodiment of the invention.

Hereinafter, wavelength converters and 2D image display devices according to embodiments of the present invention are described with reference to the accompanying drawings. It should be noted that the embodiments below are merely specific examples of the present invention and are not of the nature to limit the technical scope of the present invention. Element identified by the same reference numerals may not be repeatedly described in some cases.

First Embodiment

FIGS. 1 to 5 show a first embodiment of a wavelength converter 21 according to the invention. As shown in FIG. 1, the wavelength converter 21 of this embodiment is provided with a fiber laser 22 and a wavelength conversion element 25 for converting a fundamental wave 23 emitted from the fiber laser 22 into a harmonic output 24.

The fiber laser 22 includes a fiber 26, a laser light source 28 for outputting an excitation light 27 to be incident on the fiber 26, a fiber grating 29 formed in the fiber 26 for reflecting the fundamental wave having a preselected wavelength and a polarization beam splitter prism 30 for introducing the fundamental wave 23 outputted from the fiber 26 to the wavelength conversion element 25. The polarization beam splitter prism 30 fulfills a function of introducing the excitation light 27 emitted from the laser light source 28 to the fiber 26 by transmitting it and introducing the fundamental wave 23 emitted from the fiber 26 to the wavelength conversion element 25 by reflecting it. Further, the polarization beam splitter prism 30 prevents the light generated in the fiber laser 22 from returning to the laser light source (excitation light source).

A basic laser operation of this fiber laser 22 is described. The excitation light 27 from the semiconductor laser light source 28 in FIG. 1 passes through the polarization beam splitter prism 30 after being converted into a parallel light by a collimator lens 32a. The excitation light 27 is further condensed by a condenser lens 32b to be incident on the fiber 26 through a second reflection surface 33 of the fiber 26. The incident excitation light 27 propagates in the fiber 26 while being absorbed by a laser-active material contained in the fiber 26. After passing through the fiber grating 29, the excitation light 27 is reflected by a first reflection surface 34 to return in the fiber 26 while being absorbed by the laser-active material and disappears by being substantially entirely absorbed by the laser-active material during a round trip before reaching the second reflection surface 33. Conventionally, an excitation light is absorbed while propagating in one direction in a fiber, wherefore a gain for amplifying a fundamental wave decreases in the propagation direction of the excitation light. On the other hand, in this embodiment, a gain for amplifying the fundamental wave is uniformly high in the fiber 26 since the excitation light 27 is absorbed while making a round trip in the fiber 26.

As described above, in this embodiment, a seed light of the fundamental wave 23 is generated in the fiber 26 while the excitation light 27 makes a round trip in the fiber 26 to be substantially entirely absorbed and the gain for amplifying the fundamental wave becomes uniformly high in the fiber 26. This seed light of the fundamental wave is amplified in this resonator using the second reflection surface 33 and the fiber grating 29 as a pair of reflection surfaces, and reciprocates by being reflected many times in this resonator, thereby reaching a laser oscillation.

It should be noted that the light of the laser oscillation is formed into a linearly polarized light by a polarization direction unifying mechanism 36.

For example, a double-clad polarization maintaining fiber capable of causing the high-output excitation light 27 to propagate can be used as the fiber 26 in this embodiment. Accordingly, the excitation light 27 is absorbed by the laser-active material contained in the fiber 26 while propagating in a relatively wide region including a core of the fiber 26 and an inner cladding. Further, the high-output excitation light 27 can be used since it can propagate in the wide range of the fiber 26.

The fundamental wave 23 outputted from the fiber 26 in this way emerges from the second reflection surface 33, is converted into a parallel light by the condenser lens 32b and reaches the polarization beam splitter prism 30. A reflection surface 35 of the polarization beam splitter prism 30 is designed to select a polarization direction so as to transmit light having the wavelength of the excitation light 27 while reflecting light having the wavelength of the fundamental wave 23. Thus, the fundamental wave 23 is reflected by the reflection surface 35 of the polarization beam splitter prism 30 to be introduced to the wavelength conversion element 25.

Next, a basic operation of the wavelength conversion element 25 is described. A laser beam of the fundamental wave 23 emitted from the fiber laser 22 as described above is condensed by a condenser lens 53 to be incident on the wavelength conversion element 25. The fundamental wave 23 outputted from this fiber laser 22 is incident on the wavelength conversion element 25 and is converted into a harmonic output 24 having a wavelength that is half that of the fundamental wave 23 by the nonlinear optical effect of the wavelength conversion element 25. This converted harmonic output 24 is partly reflected by a beam splitter 37, but the harmonic output 24 having passed through the beam splitter 37 is almost entirely emitted as an output beam of the wavelength converter 21.

A part of a harmonic output 38 reflected by the beam splitter 37 is utilized by being received by a light receiving element 39 for the monitoring of the output beam of the wavelength converter 21 and converted into an electrical signal used. Based on the intensity of this converted signal, an output controller 40 regulates a drive current of the laser light source 28 by means of a laser current source 41 for excitation so that a desired output can be obtained in the wavelength converter 21. The output controller 40 also regulates temperature with an accuracy of 0.01° C. by means of Peltier elements 46, 47 so as to maximize the harmonic output 24. In this way, the intensity of the excitation light 27 from the laser light source 28 is regulated and the output intensity of the fundamental wave 23 of the fiber laser 22 is regulated, with the result that the output intensity of the wavelength converter 21 is regulated. Thus, the output intensity of the wavelength converter 21 is kept constant by a so-called automatic power control (hereinafter, abbreviated as "APC"). In order to more accurately control the output intensity of the wavelength converter 21 by the APC, a light receiving element 42 may be arranged at the outer side of the first reflection surface 34 of the fiber 26. Then, the light receiving element 42 can detect the fundamental wave 23 slightly leaking out without being reflected by the fiber grating 29 or the excitation light 27 slightly leaking out without being reflected by the first reflection surface 34. By respectively estimating the intensities of the entire excitation light 27 and fundamental wave 23 based on these detection data, the output controller 40 regulates a drive current of the laser light source 28 by means of the laser current source 41 for excitation to regulate the output intensity of the wavelength converter 21 by the APC. Similarly, it is also possible to detect a part 44 of the excitation light 27 slightly reflected by a surface 43 opposite to the reflection surface 35 for reflecting the fundamental wave 23 in the polarization beam splitter prism 30 by means of a light receiving element 50, whereby the intensity of the entire excitation light 27 can be estimated based on the part 44 of the excitation light 27 and the output controller 40 can perform the APC operation.

In this embodiment is proposed a method for efficiently radiating heat generated by the fiber 26 and retaining the fiber 26 in an easy-to-handle state.

First, a construction for efficiently radiating the heat generated by the fiber 26 is described with reference to FIGS. 2 and 3.

Figure 2:
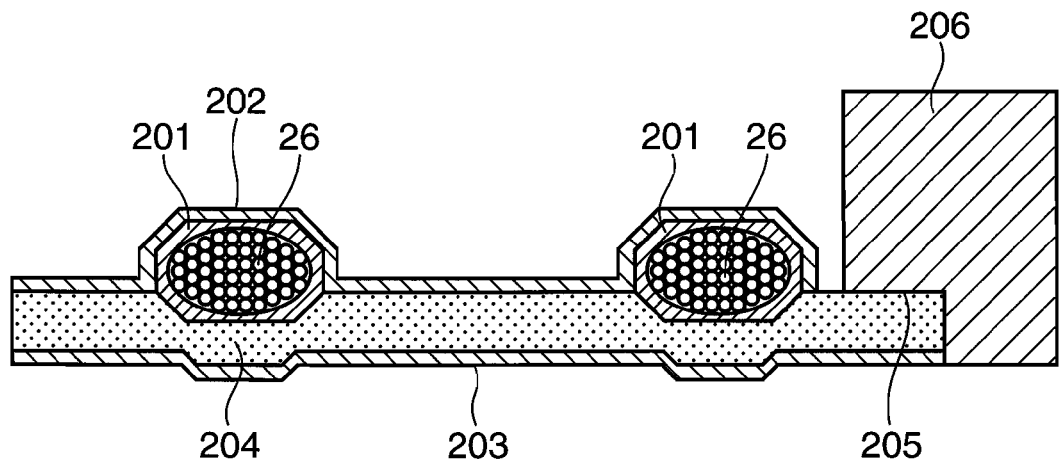
FIG. 2 is a cross-sectional diagram showing a fiber heat radiating structure.

FIG. 2 is a cross-sectional diagram showing a heat radiating structural portion provided at the outer side of the fiber 26. Each fiber 26 has an entire length of about 10 m and is coiled to have a diameter of about 10 cm. A coiled part of the fiber 26 is covered by a sheet-like heat radiating material 201 (aluminum in this embodiment). Further, a heat transfer sheet 204 (graphite sheet) for transferring the heat generated by the fiber 26 to the outside is arranged in contact with the heat radiating material 201. Specifically, the heat transfer sheet 204 is formed with a groove corresponding to the coiled shape of the fiber 26, and the coiled part of the fiber 26 is placed in this groove. Thus, the coiled part of the fiber 26 is positioned relative to the heat transfer sheet 204. Further, resin sheets 202, 203 for vacuum packaging are arranged at the outer sides of the heat transfer sheet 204. The heat transfer sheet 204 is held in direct contact with the heat radiating material 201 at the inner sides of the resin sheets 202, 203 without via the resin sheets 202, 203, thereby absorbing the heat radiated by the heat radiating material 201. On the other hand, a part of the heat transfer sheet 204 is not covered by the resin sheets 202, 203 and the heat radiated by the heat radiating material 201 is radiated from a part of this resin-sheet uncovered part 205.

In addition, a side of the sheet-like heat radiating material 201 covering the fiber 26, which side is held in contact with the fiber 26, serves as a reflection surface for reflecting light having the wavelength of the excitation light. Thus, a part of the excitation light radiated to the outside of the fiber 26 can be reutilized in the coiled part of the fiber 26. Conventionally, an excitation light radiated to the outside of a fiber has been dismissed as a loss of the excitation light. Since the reflection surface is formed using the surface of the aluminum sheet as a mirror surface in this embodiment, the excitation light that has been conventionally dismissed can be reutilized by being reflected into the interior of the fiber.

In the case of the present application, aluminum or gold is suitable as the material of the heat radiating material 201 since the wavelength of the excitation light lies in a range of 900 nm (inclusive) to 980 nm (inclusive).

It should be noted that heat can be more efficiently radiated by filling a silicon resin transparent and having high heat conductivity in the wavelength range of the excitation light in a clearance of the coiled fiber 26. In this case, a part of the silicon resin held in contact with the outer surface of the fiber 26 serves as a reflection surface.

Figure 3:
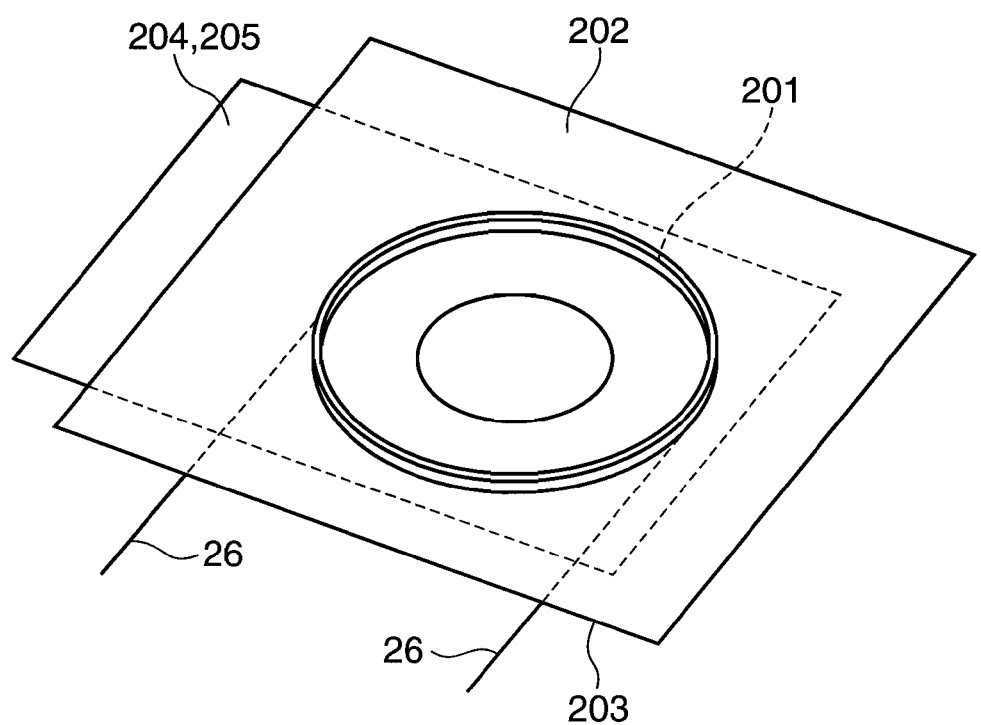
FIG. 3 is a perspective view of the fiber heat radiating structure.

FIG. 3 is a diagram showing the fiber 26 with a heat radiating structure. The heat absorbed by the aluminum sheet as the heat radiating material 201 is carried in the graphite sheet (PGS graphite sheet produced by Panasonic Electronic Devices Co., Ltd.) as the heat transfer sheet 204 to be radiated to the outside of the resin sheets 202, 203. By bringing the resin-sheet uncovered portion 205 of the heat transfer sheet 204 and a member such as a heat sink 206 into contact, the heat of the fiber 26 can be efficiently radiated. Here, the heat generated by the fiber 26 can be smoothly radiated to the outside by using a graphite sheet having a small heat resistance as the heat transfer sheet 204.

Figure 4:
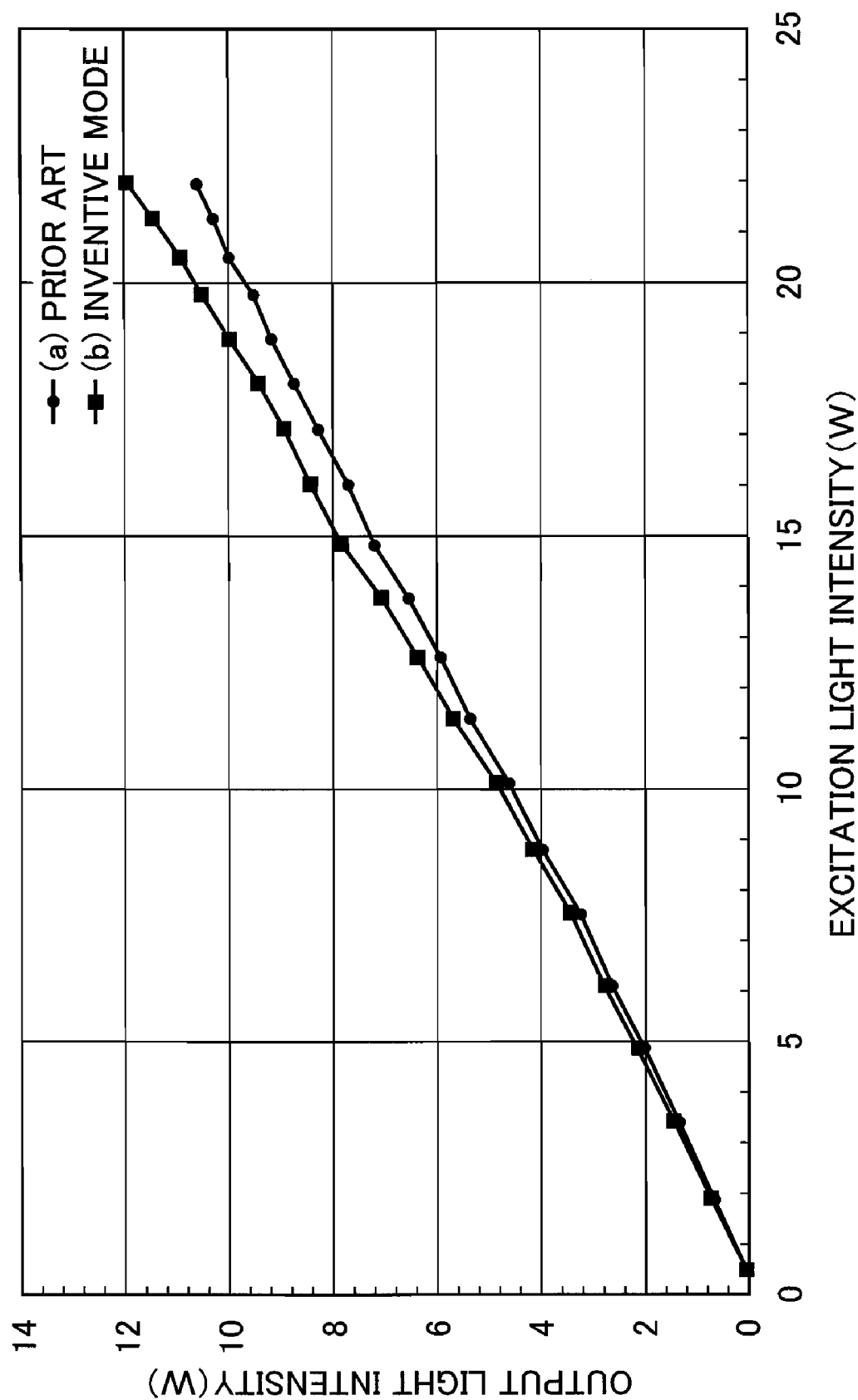
FIG. 4 is a graph showing input/output characteristics of a fiber laser resonator in the case of applying fiber structures according to a prior art and the present invention.

FIG. 4 is a plot graph showing input/output characteristics, wherein a curve (a) represents a case where the heat radiating structure of this embodiment is present and a curve (b) represents a case where the heat radiating structure of this embodiment is absent. In the case where the heat radiating structure was present, it was found out that a conversion efficiency (light-to-light conversion efficiency) from an excitation light to an oscillating light was improved from 48% to 53% by about 5%.

As can be understood from the above, the conversion efficiency from the excitation light to the oscillating light can be improved by applying the structure of this embodiment to the fiber laser light source and the fiber 26 can be made smaller and easier to handle by vacuum packaging the fiber 26 in the resin.

Figure 6:
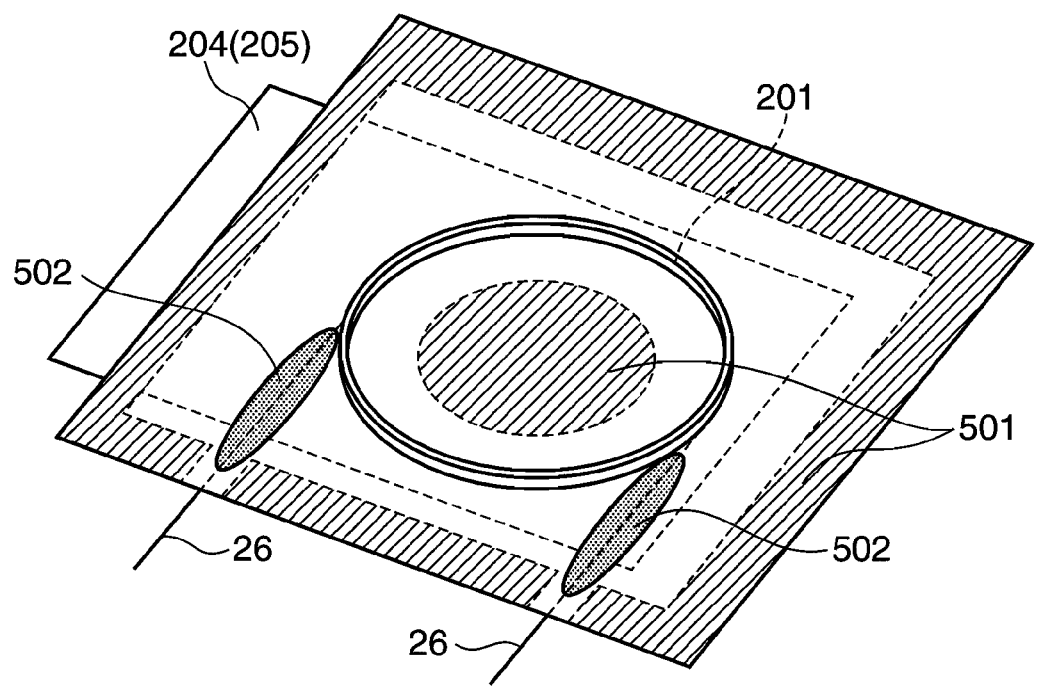
FIG. 6 is a perspective view showing the heat radiating structure and a sealing portion.
Figure 7:
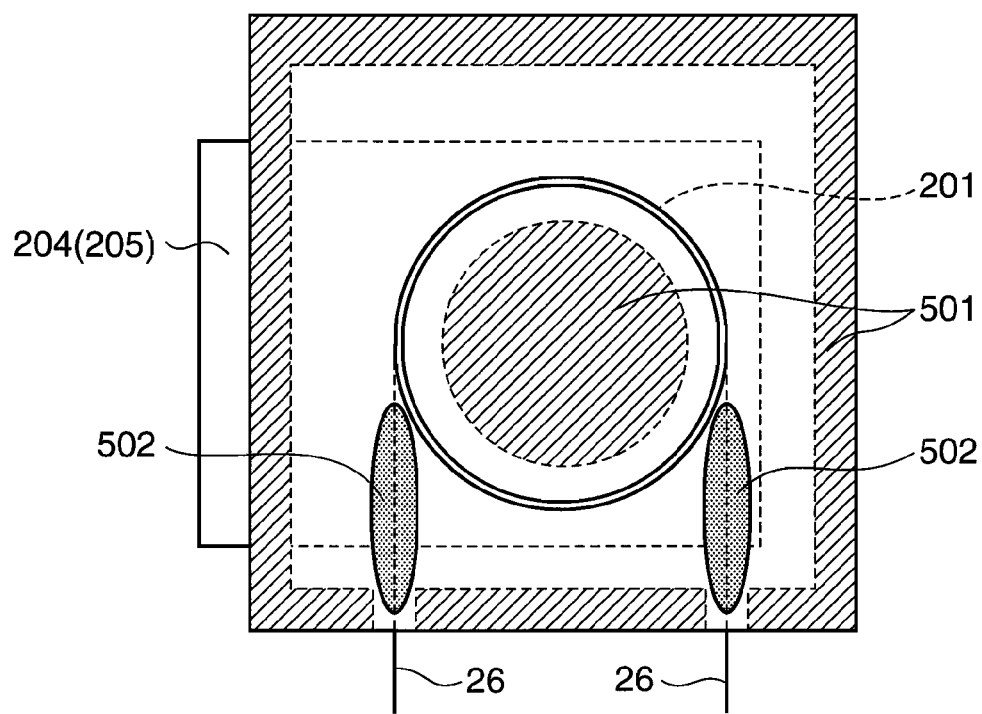
FIG. 7 is a plan view showing the heat radiating structure and the sealing portion.

Attentions to be paid in the case of vacuum packaging the fiber 26 as in this embodiment are described with reference to FIGS. 6 and 7. The resin sheets 202, 203 are bonded by thermocompression at the inner side of the coiled part and at the outer peripheral edges (hatched portions 501 in FIGS. 6 and 7) except sections 502 for the passage of the fiber for input and output. In the sections 502 for the passage of the fiber for input and output, sealing is provided between the resin sheets 202, 203 using a UV curable resin having a low refractive index in order to prevent the leakage of the excitation light. In this construction, a double clad fiber is used as the fiber 26. If this fiber 26 is held in contact with the resin sheets 202, 203 of the vacuum packaging, the excitation light leaks to cause the deterioration of the fiber laser itself. Thus, in the case of using a double clad fiber, it is particularly important to prevent the contact of the fiber 26 and the resin sheets 202, 203.

The resin-sheet uncovered portion 205 that is a part of the heat transfer sheet 204 (graphite sheet in this embodiment) is arranged not to be covered by the resin sheets 202, 203. By bringing the resin-sheet uncovered portion 205 into contact with metal or the like, the heat generated by the fiber 26 can be smoothly radiated.

Figure 5:
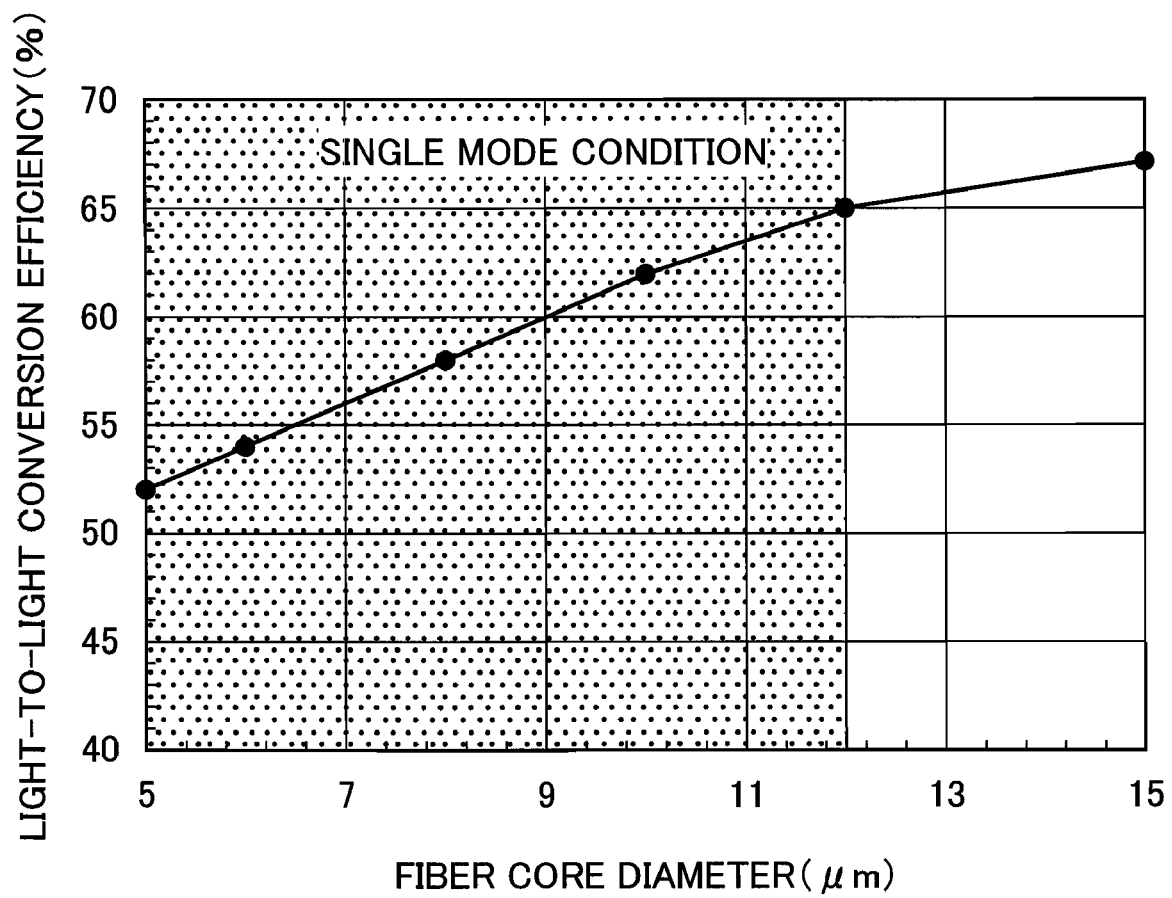
FIG. 5 is a graph showing a relationship between a core diameter of a fiber and a conversion efficiency from an excitation light into an oscillating light.

In order to further improve the efficiency, it is preferable to set a large ratio of the core diameter to the cladding diameter of the fiber 26. In the present case is used the fiber having a cladding diameter of 125 µm and a core diameter of 5 to 6 µm. If the cladding diameter is fixed at 125 µm, the conversion efficiency from the excitation light to the oscillating light (light-to-light conversion efficiency) can be increased as the core diameter is increased to 8 µm, 10 µm, 12 µm and 15 µm. FIG. 5 is a plot graph showing a relationship of the core diameter and the light-to-light conversion efficiency in the case where the cladding diameter is 125 µm. In FIG. 5, it can be understood that the light-to-light conversion efficiency is about 52% when the core diameter is 5 µm, tends to improve as the core diameter increases, and exceeds 65% when the core diameter exceeds 12 µm. Here, since the oscillating light is used for the wavelength conversion, the transverse mode thereof needs to be a single mode. If the core diameter is excessively increased, the single mode cannot be maintained. Thus, there exists an upper limit for the core diameter. Specifically, the core diameter preferably lies in a range of 5 µm to 12 µm (hatched part in FIG. 5). In the case of wishing the maintenance of the single mode even if the fiber is coiled to have a diameter of 10 cm or shorter, the core diameter more preferably lies in the range of 5 µm to 10 µm.

Second Embodiment

Figure 8:
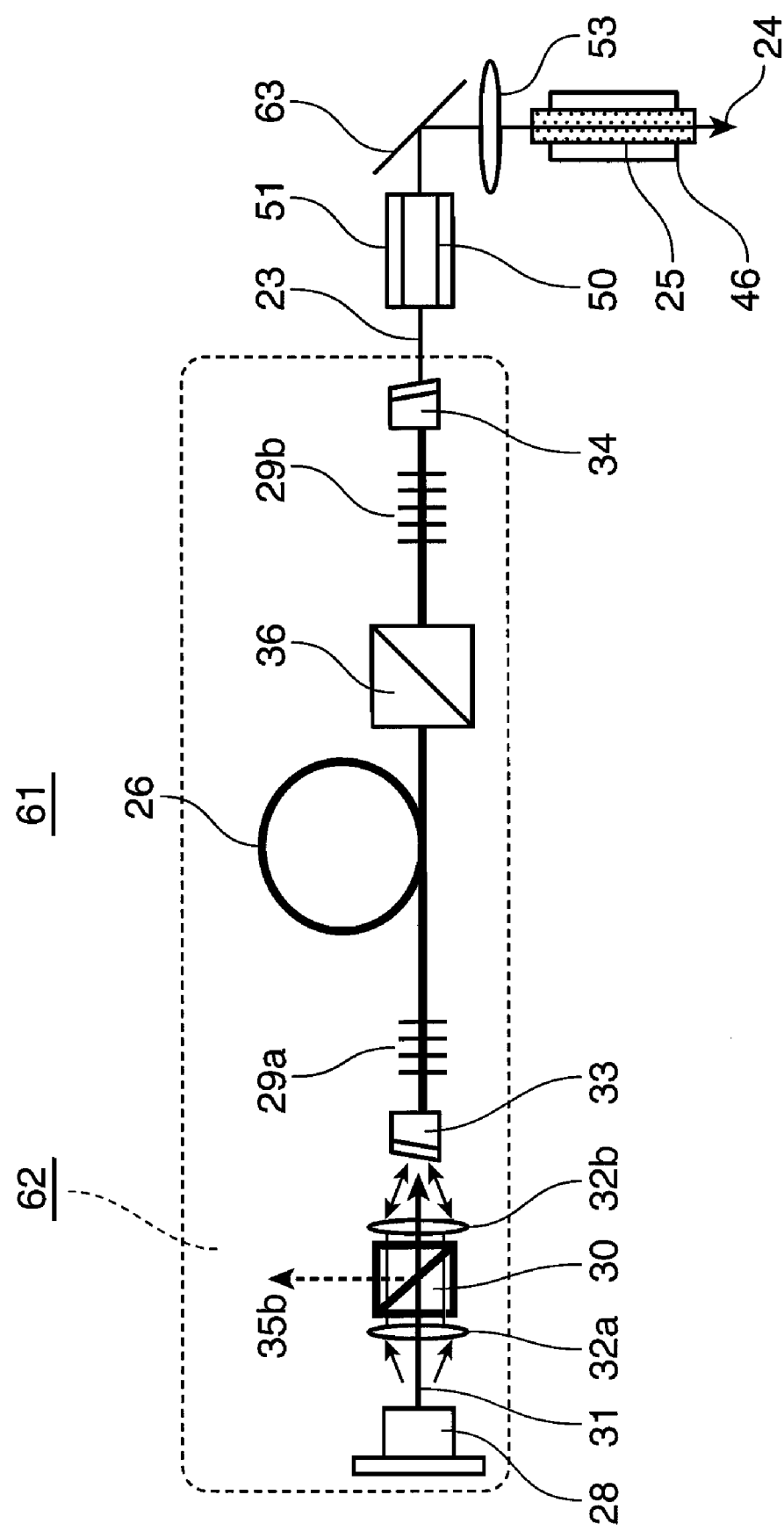
FIG. 8 is a schematic construction diagram of a wavelength converter according to a second embodiment of the invention.

FIG. 8 shows a second embodiment of the present invention. A wavelength converter 61 and a fiber laser 62 according to the second embodiment are so constructed as to realize functions similar to those of the first embodiment by another mode. The construction of the second embodiment is successively described with reference to FIG. 8. Structural differences from the first embodiment are that a fiber laser resonator includes a pair of fiber Bragg gratings (FBG 29a, 29b) and that an oscillating laser beam is emitted from an end surface different from an excitation light incident end.

As shown in FIG. 8, the wavelength converter 61 of this embodiment is provided with the fiber laser 62 and a wavelength conversion element 25 for converting a fundamental wave 23 emitted from the fiber laser 62 into a harmonic output 24.

The fiber laser 62 includes a fiber 26, a laser light source 28 for emitting an excitation light 27 to be incident on the fiber 26, the FBGs 29a, 29b formed in the fiber 26 for reflecting the fundamental wave while selecting the wavelength of the fundamental wave and a polarization beam splitter prism 30 for preventing the incidence of an inadvertently generated ASE (Amplified Spontaneous Emission) giant pulse on the excitation light source 28.

The fundamental wave 23 as a laser beam to be generated is emitted from an end surface 34. The fundamental wave 23 passes through a light limiter 51 and propagates along an optical path bent by a reflecting mirror 63 to be incident on the wavelength conversion element 25, thereby being converted into a second harmonic.

Here, the reflection bandwidth of the FBG 29a is about 1 nm and the reflectance thereof is 99% or higher. The reflection bandwidth of the FBG 29b is about 0.05 nm. It is preferable to have a relationship that the bandwidth of the FBG 29a is larger than that of the FBG 29b. A relationship between the reflectance of the FBG 29b and that of the end surface 34 of the fiber 26 in the oscillation wavelength range of the fiber laser 62 needs to be such that the reflectance of the FBG 29b is higher than that of the end surface 34. In the case of deviation from this relationship, a giant pulse is generated when an inadvertent reflected light is incident from the outside, which becomes the cause of destroying the excitation light source and optical elements. Specifically, the reflectance of the FBG 29b in the oscillation wavelength range of the fiber laser 62 is preferably set to 15% or higher and 20% or lower. If the reflectance is above 20%, the efficiency of the fiber laser decreases, therefore, the reflectance preferably lies in this range.

In order to prevent the generation of the ASE giant pulse, the opposite end faces of the fiber are formed to be at an angle of 7° or larger with respect to a direction normal to the axial line of the fiber. It is necessary not to make end surfaces 33, 34 parallel to each other in order to prevent the generation of the giant pulse. In other words, by inclining the end surfaces 33, 34 of the fiber, a resonator having a small Q-value is constructed between the opposite end faces 33, 34 of the fiber, whereby resonance between the respective end surfaces 33, 34 at the time of strong excitation can be suppressed to suppress the generation of the ASE. In the drawings of the present application, the end faces of the fiber are intentionally enlarged to make the shapes of the fiber end faces 33, 34 easily understandable and, actually, no large members are attached to the end faces.

The construction of the second embodiment is functionally similar to that of the first embodiment.

Next, a basic operation of the wavelength conversion element 25 is described. The laser beam of the fundamental wave 23 is emitted from the fiber laser 22 as described above, and condensed by a condenser lens 36 to be incident on the wavelength conversion element 25. The fundamental wave 23 from the fiber laser 22 is incident on the wavelength conversion element 25 and converted by the nonlinear optical effect of the wavelength conversion element 25. In this way, the harmonic output 24 having a wavelength that is half that of the fundamental wave 23 is outputted.

Using the wavelength converter 61 constructed as above, a W-class green beam was obtained from the wavelength conversion element 25 similar to the first embodiment. However, since this construction is not for returning the fundamental wave, an excitation light efficiency and a conversion efficiency from an applied power to a green beam decrease. Therefore, in terms of efficiency, the first embodiment is more preferably used.

Even in the case of providing the FBGs 29a, 29b at the opposite ends of the fiber 26 as in this embodiment, it is confirmed that efficiency can be improved as in the first embodiment by providing a heat radiating structure for the fiber 26. At this time, the structure of the first embodiment shown in FIGS. 2, 3, 6 and 7 can be applied as it is.

In order to further improve the efficiency, it is preferable to set a large ratio of the core diameter to the cladding diameter of the fiber 26. In the present case is used the fiber having a cladding diameter of 125 μm (variable in a range of 120 to 130 μm due to manufacturing errors) and a core diameter of 5 to 6 μm. If the cladding diameter is fixed at 125 μm, the conversion efficiency from an excitation light to an oscillating light can be increased as the core diameter is increased to 8 μm, 10 μm, 12 μm and 15 μm. Here, since the oscillating light is used for the wavelength conversion, the transverse mode thereof needs to be a single mode. If the core diameter is excessively increased, the single mode cannot be maintained. Thus, there exists an upper limit for the core diameter. Specifically, the core diameter preferably lies in a range of 5 μm to 12 μm. In the case of wishing the maintenance of the single mode even if the fiber is coiled to have a diameter of 10 cm or shorter, the core diameter more preferably lies in the range of 5 μm to 10 μm. This point is also the same as in the first embodiment.

Figure 9:
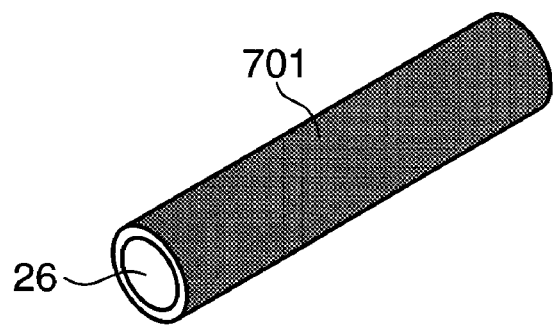
FIG. 9 is a perspective diagram of a fiber of a fiber heat radiating structure.
Figure 10:
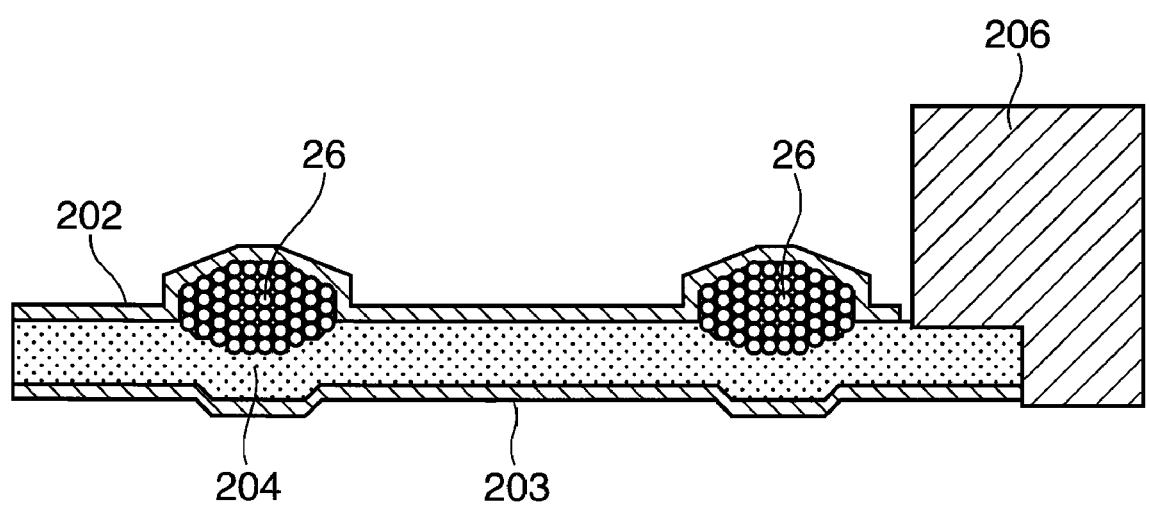
FIG. 10 is a cross-sectional diagram showing one embodiment the fiber radiating structure.
Figure 11:
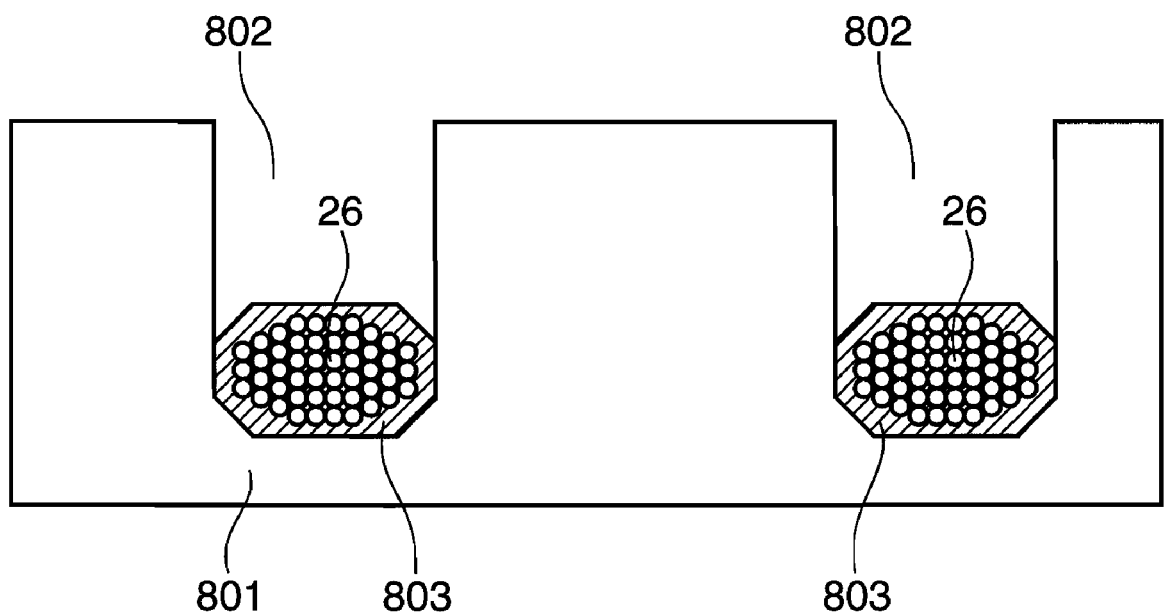
FIG. 11 is a cross-sectional diagram of a fiber heating structure.

The following mode illustrated in FIGS. 9 to 11 may be adopted in the first and second embodiment.

In FIG. 9, the leakage of the excitation light is prevented and heat generated by the fiber 26 is smoothly radiated by applying a metal coating 701 to the outer side of a coating film of the fiber 26. Since the oscillation wavelength lies in the range of 900 to 980 nm in this embodiment as well, aluminum or gold is suitable as the material of the metal coating 701. In this embodiment, the metal coating 701 is formed through the deposition of these metals on the coating film of the fiber 26. An apparatus for depositing a magnetic material on a magnetic tape can be, for example, used as a deposition apparatus, whereby the metal can be coated without heating the fiber.

The fiber shown in FIG. 9 may be vacuum packaged using the heat transfer sheet 204 and the resin sheets 202, 203 of the first embodiment as shown in FIG. 2. By so doing, the fiber can be more easily handled and the heat of the fiber can be better radiated.

By coating the fiber as above, an operation step of winding a sheet-like metal around the coiled part of the fiber 26 can be omitted, whereby cost can be reduced.

FIG. 11 shows a method for arranging (embedding) the coiled fiber 26 in a heat radiating material 803. Since the heat radiating material can be filled between the coiled parts of the fiber 26 by this method, a contact area of the fiber 26 and the heat radiating material 803 can be increased, whereby the heat generated by the fiber 26 can be more efficiently absorbed. If a material having a large refractive index and a high heat conductivity is used as this heat radiating material 803, a surface of the heat radiating material 803 held in contact with the fiber 26 can be utilized as the reflection surface and the leakage of the excitation light from the fiber 26 can be suppressed. Specifically, the fiber 26 coiled to have a diameter of about 10 cm is accommodated in a metallic case 801. The case 801 is formed with a fiber accommodating groove 802 for accommodating the fiber 26, and the fiber 26 is placed in this fiber accommodating groove 802. Further, the heat radiating material 803 is provided inside of the fiber accommodating groove 802.

On the other hand, in the case of adopting the embedded structure shown in FIG. 11 using the fiber coated with the heat radiating material shown in FIG. 9, silicon grease can be, for example, used as the heat radiating material 803. In this construction, the heat of the fiber absorbed by the coated heat radiating member 701 can be radiated not only to the heat radiating member 701, but also to the heat radiating material (silicon grease) 803 while the reutilization of the excitation light is realized by the coated heat radiating member 701 (see FIG. 9).

Third Embodiment

Figure 12:
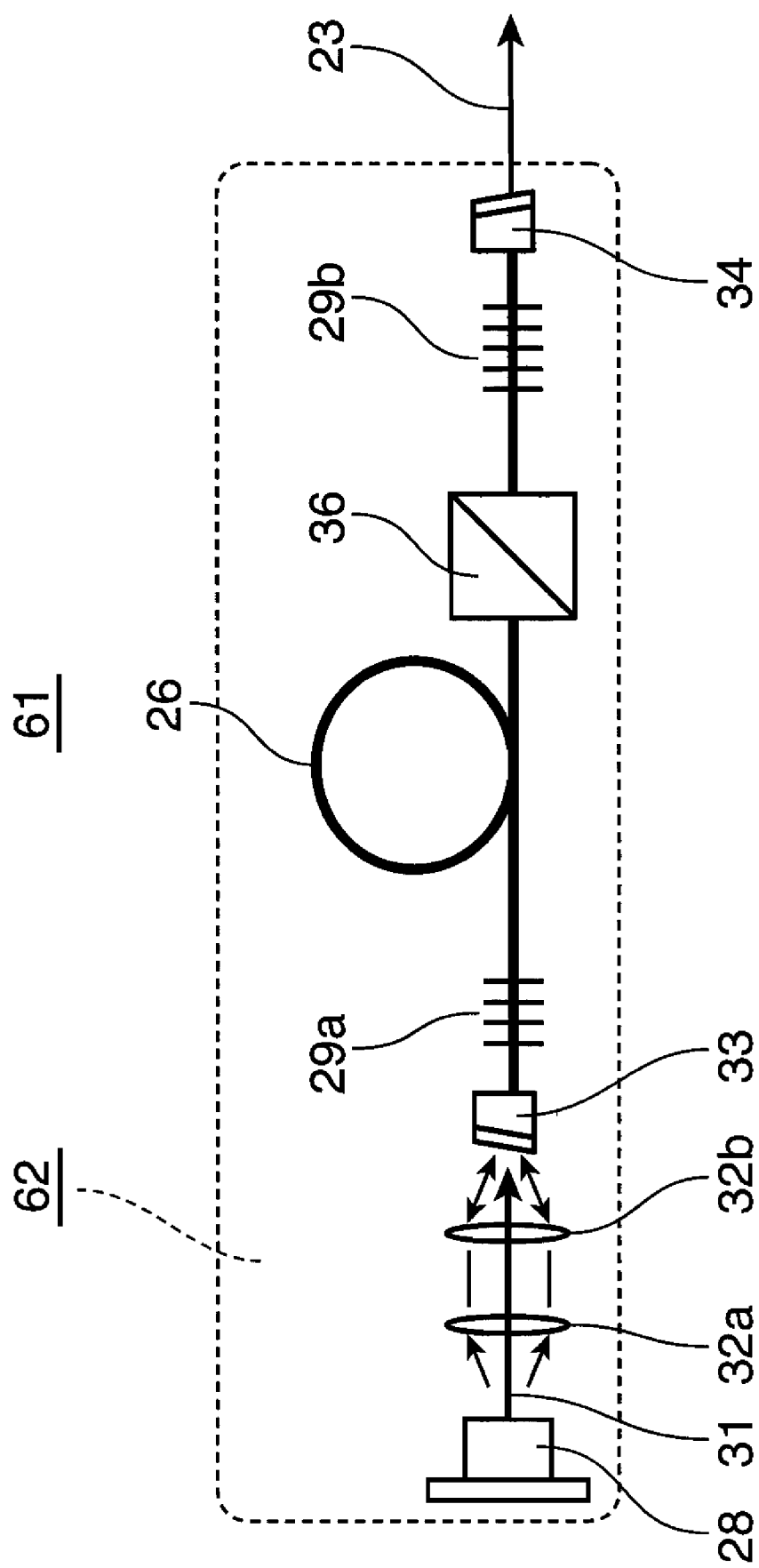
FIG. 12 is a schematic construction diagram of a wavelength converter according to a third embodiment of the invention.

FIG. 12 shows a third embodiment of the present invention. In a wavelength converter 61 of the third embodiment, the polarization beam splitter prism 30 in the construction of the second embodiment is left out. In FIG. 12, a construction similar to the second embodiment is described with the same reference numerals.

A fiber 26 of the wavelength converter 61 of the third embodiment is doped with Pr (praseodymium) as a rare earth element and adapted to oscillate a red beam having a wavelength of 600 nm (inclusive) to 630 nm (inclusive).

A fiber laser 62 is provided with an excitation light source 28 including a GaN semiconductor laser (oscillation wavelength of 440 nm (inclusive) to 450 nm (inclusive)), the fiber 26 as a laser medium and fiber gratings 29a, 29b.

An excitation light emitted from the excitation light source 28 is incident on an end surface 33 of the fiber 26 via lenses 32a, 32b. On the other hand, a fundamental wave 23 is emitted from an end surface 34 of the fiber 26.

Further, the fiber laser 62 includes a polarization direction unifying mechanism (polarizer) 36 for converting an oscillating light into a linearly polarized light. The fiber 26 is a polarization maintaining fiber.

Here, the reflection bandwidth of the fiber grating 29a is about 1 nm and the reflectance thereof is 99% or higher. The reflection bandwidth of the fiber grating 29b is about equal to or larger than 0.1 nm and equal to or smaller than 0.5 nm. In the case of converting a red beam generated by the fiber laser 62 into a second harmonic by the wavelength conversion element 25 as in this embodiment, the wavelength bandwidth of the fiber grating 29b is preferably equal to or smaller than 0.05 nm. It is preferable to have a relationship that the bandwidth of the fiber grating 29a is larger than that of the fiber grating 29b. A relationship between the reflectance of the fiber grating 29b and that of the end surface 34 of the fiber 26 in the oscillation wavelength range of the fiber laser 62 needs to be such that the reflectance of the fiber grating 29b is higher than that of the end surface 34. In the case of deviation from this relationship, a giant pulse is generated when an inadvertent reflected light is incident from the outside, which becomes the cause of destroying the excitation light source and optical elements. Specifically, the reflectance of the fiber grating 29b is preferably 95% or higher.

The construction of the third embodiment is also functionally similar to those of the first and second embodiments.

A W-class red beam was obtained using the fiber laser 62 having the above construction. Further, a conversion efficiency from the excitation light to the red beam can be further improved in the case of adopting the construction for reflecting the excitation light by one end surface of the fiber 26 as in the first embodiment.

Even in the case of providing the fiber gratings 29a, 29b at the opposite ends of the fiber 26 as in this embodiment, it is confirmed that efficiency can be improved as in the first and second embodiments by providing a heat radiating structure for the fiber 26. At this time, the structure of the first embodiment shown in FIGS. 2, 3, 6 and 7 can be applied as it is.

In order to further improve the efficiency, it is preferable to set a large ratio of the core diameter to the cladding diameter of the fiber 26. In the present case is used a fiber having a cladding diameter of 125 μm (variable in a range of 120 to 130 μm due to manufacturing errors) and a core diameter of 4 to 5 μm. If the cladding diameter is fixed at 125 μm, the conversion efficiency from an excitation light to an oscillating light can be increased as the core diameter is increased to 8 μm, 10 μm, 12 μm and 15 μm. In order to directly utilize the emitted red beam, the ratio of the core diameter to the cladding diameter is preferably set to about 1:10. By so doing, the absorption efficiency of the excitation light, i.e. the conversion efficiency from the excitation light to the oscillating light can be improved by ensuring a wide area of the cladding where the excitation light passes. On the other hand, in the case of using the oscillating red beam for the wavelength conversion, the transverse mode of the oscillating light needs to be a single mode. If the core diameter is excessively increased, the single mode cannot be maintained. Thus, there exists an upper limit for the core diameter. Specifically, the core diameter preferably lies in a range of 5 μm to 12 μm. In the case of wishing the maintenance of the single mode even if the fiber is coiled to have a diameter of 10 cm or shorter, the core diameter more preferably lies in a range of 5 μm to 10 μm. This point is also the same as in the first embodiment.

The construction of FIG. 9 can be also adopted in the third embodiment. In FIG. 9, the leakage of the excitation light is prevented and heat generated by the fiber 26 is smoothly radiated by applying the metal coating 701 to the outer side of a coating film of the fiber 26. Since the excitation wavelength lies in a range of 440 nm (inclusive) to 450 nm (inclusive) in this embodiment, aluminum or tantalum is suitable as the material of the metal coating 701. In this embodiment, the metal coating 701 is formed through the deposition of these metals on the coating film of the fiber 26. An apparatus for depositing a magnetic material on a magnetic tape can be, for example, used as a deposition apparatus, whereby the metal can be coated without heating the fiber.

The fiber shown in FIG. 9 may be vacuum packaged using the heat transfer sheet 204 and the resin sheets 202, 203 of the first embodiment as shown in FIG. 2. By so doing, the fiber can be more easily handled and the heat of the fiber can be better radiated.

By adopting the constructions of the first to third embodiments, a problem of saturating the efficiency can be solved in such a high-output wavelength converter in which an output of a fundamental wave laser beam exceeds 7 W.

The present invention may also be applied to a construction for emitting a green laser beam having a wavelength of 515 nm (inclusive) to 540 nm (inclusive). Since a green laser output beam having a high luminosity factor can be obtained by this construction, color reproduction closer to original colors can be realized by using this construction in a display or the like having good color reproducibility.

If the present invention is applied to a construction for emitting yellow green to orange laser beams having wavelengths of 540 nm (inclusive) to 600 nm (inclusive), there can be obtained efficient laser light sources usable in applications other than the one for displays such as medical applications or usable as lasers for physical and chemical experiments. The wavelength converters of the embodiments of the present invention are effectively constructed to generate a fundamental wave laser beam having an output of 7 W or higher and a wavelength of 1030 nm to 1200 nm and necessary to obtain a visible laser beam.

The fiber 26 thermally expands (dimensional change) in longitudinal direction due to the heat generated thereby in some cases. In such cases, the refractive index of the fiber grating 29 changes due to the thermal expansion of the fiber 26 to change the wavelength of the oscillating light, with the result that an output might possibly vary at the time of wavelength conversion. The dimensional change of the fiber 26 in longitudinal direction resulting from a temperature change is preferably suppressed in part(s) corresponding to the fiber grating(s) 29 or 29a, 29b by a temperature compensating mechanism using a bimetal, a ceramic material having a negative thermal expansion coefficient or the like. By so doing, the variation of the oscillating wavelength can be suppressed to or below 0.05 nm/° C.

Fourth Embodiment

In a fourth embodiment is shown an example in which a wavelength conversion light source shown in the first to third embodiments is used in the display application.

Figure 13:
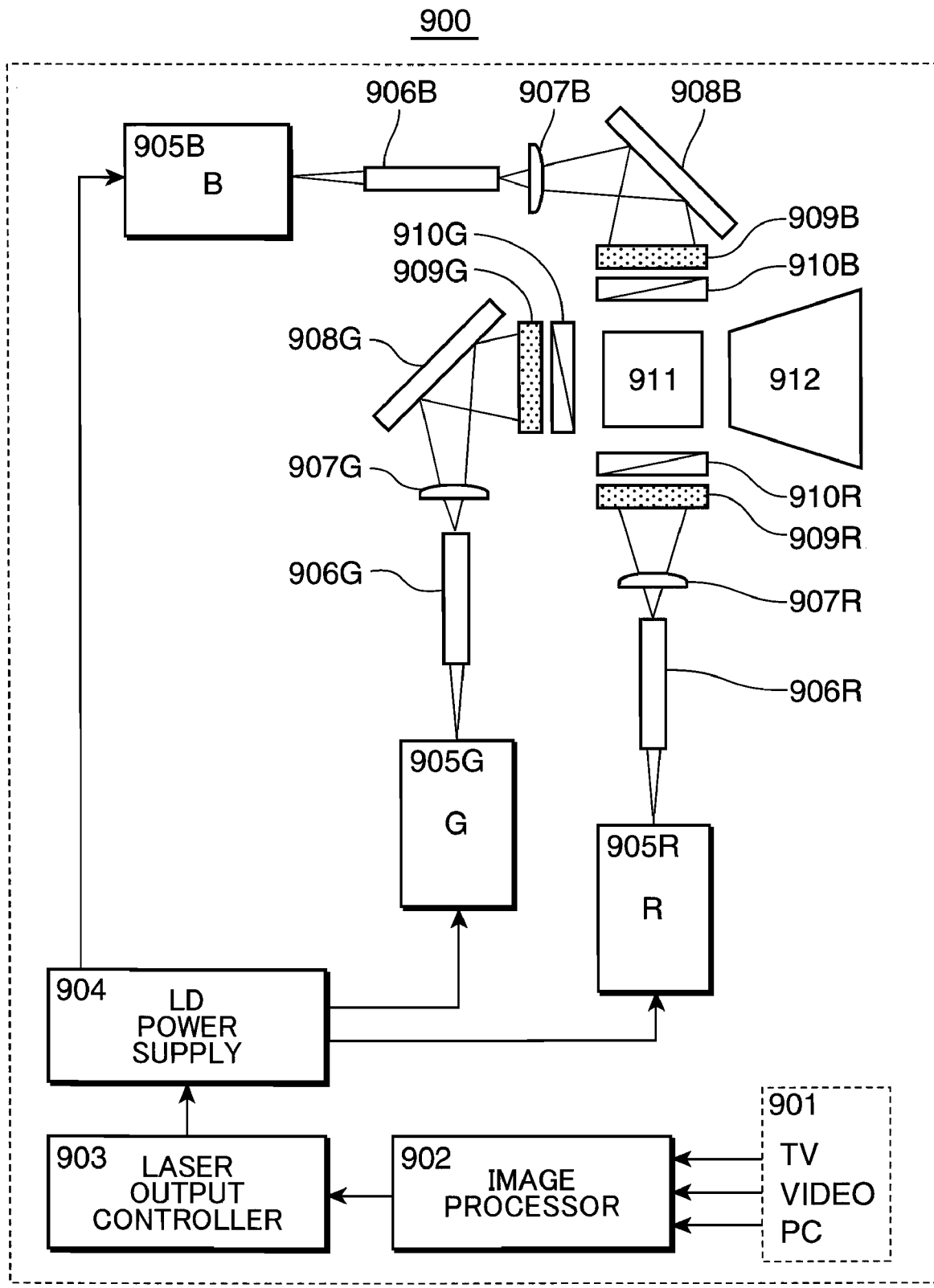
FIG. 13 is a diagram showing an example of a 2D image display device adopting the wavelength converter of the invention.

As shown in FIG. 13, a 2D image display device 900 of this embodiment is an example of the application of the wavelength converter according to the above embodiments to an optical engine of a projector using three liquid crystal display panels. The 2D image display device 900 is provided with an image processor 902, a laser output controller (controller) 903, an LD power supply 904, red, green and blue laser light sources 905R, 905G, 905B, beam forming rod lenses 906R, 906G and 906B, relay lenses 907R, 907G and 907B, reflecting mirrors 908G, 908B, 2D modulation elements 909R, 909G and 909B for displaying images, polarizers 910R, 910G and 910B, a cross prism 911 and a projection lens 912.

Particularly, the wavelength converters described in the first and second embodiments concern the green laser light source 905G, which is controlled by the laser output controller 903 and the LD power supply 904 for controlling the output of the green laser light source 905G.

On the other hand, the wavelength converter described in the third embodiment concerns the red laser light source 905R, which is controlled by the controller 903 and the LD power supply 904 for controlling the output of the red laser light source 905R.

Laser beams from the respective light sources 906R, 906G and 906B are shaped into rectangular beams by the rod lenses 906R, 90G and 90B to illuminate the 2D modulation elements of the respective colors through the relay lenses 907R, 907G and 907B. The two-dimensionally modulated images of the respective colors are multiplexed by the cross prism 911 and projected onto a screen by the projection lens 912 to be displayed as a video image.

Since a laser resonator can be accommodated in a closed system in the fiber in each of the red and green laser light sources 905R, 905G, a loss of the resonator caused by dust from the outside or the misalignment of the reflection surfaces can be suppressed. Thus, an output reduction with time and an output variation of the laser resonator can be suppressed.

On the other hand, the image processor 902 generates a light quantity control signal for varying an output of a laser beam in accordance with the luminance information of an inputted video signal 901 and sends it to the laser output controller 903. By controlling the light quantity in accordance with the luminance information, contrast can be improved.

Particularly, in the case of applying such a control method for changing an average light quantity by pulse-driving a laser and changing a duty ratio of a laser turn-on period (turn-on period/(turn-on period+turn-off period)) (PWM control), the heat can be efficiently radiated from the fiber 26 within the turn-off period by adopting the construction of the present application.

Figure 15:
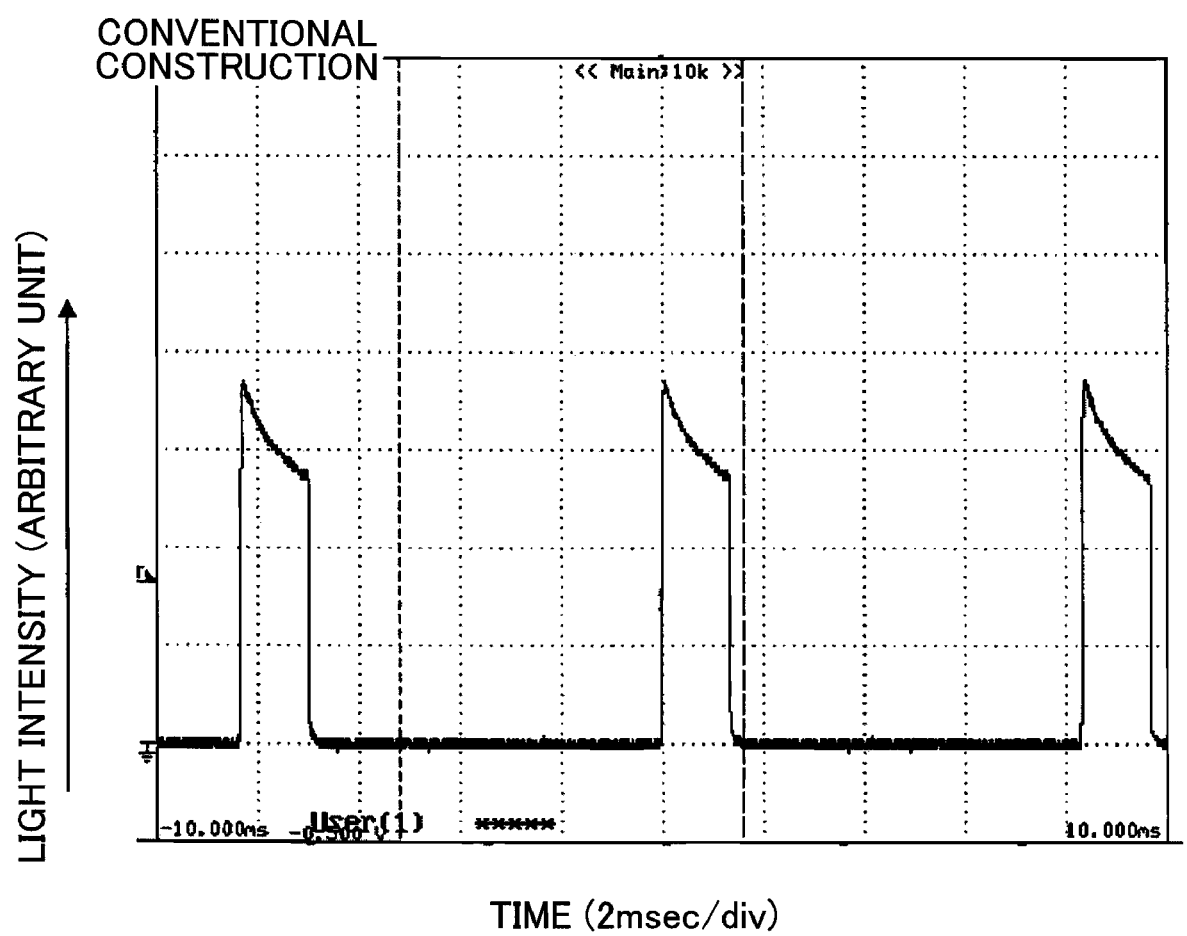
FIG. 15 is a graph showing a light output waveform in the case of a pulse drive using a conventional construction.

Specifically, there has conventionally occurred a phenomenon in which, despite the electric input of a rectangular wave, a light output comes to have a wedge-shaped waveform (drooping) as shown in FIG. 15. This results from the fact that the laser resonator is influenced by the heat to reduce the efficiency.

Figure 16:
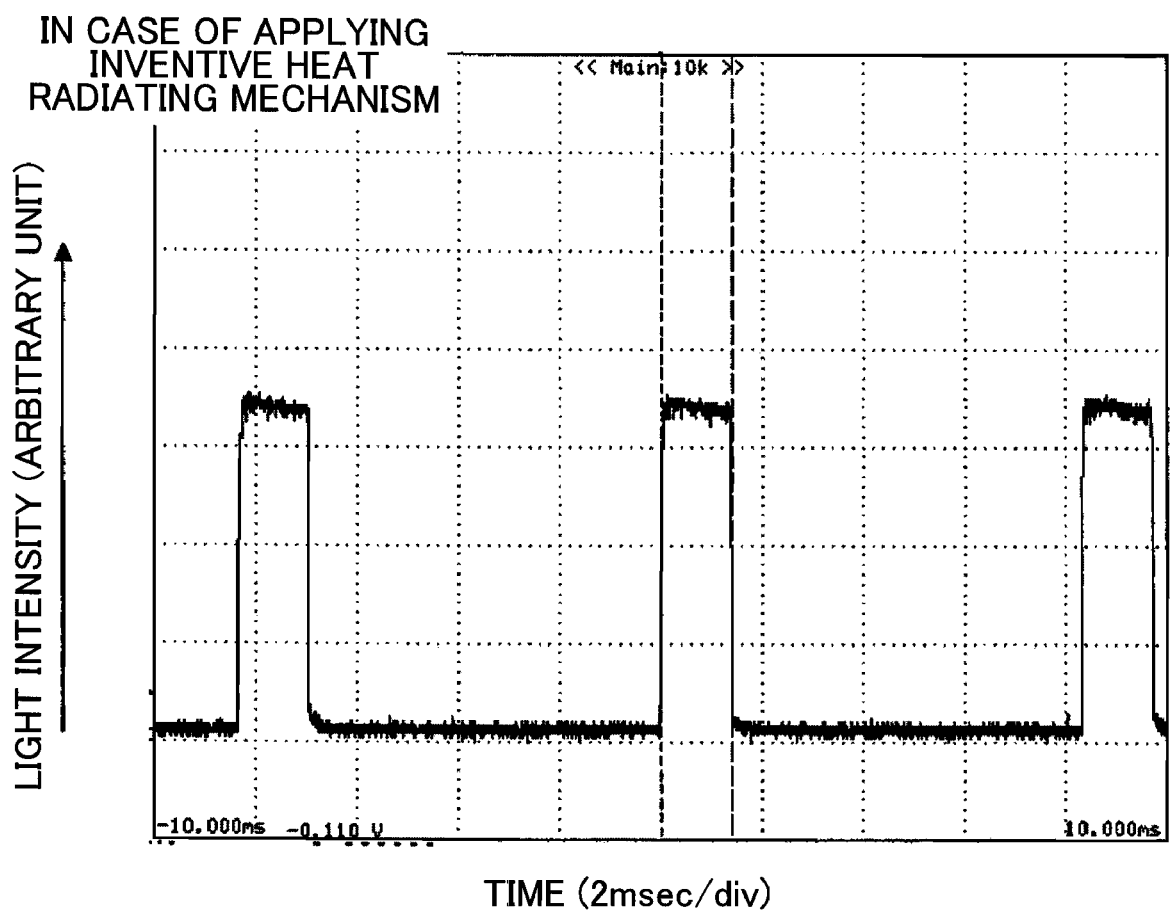
FIG. 16 is a graph showing a light output waveform in the case of a pulse drive using an inventive construction.

By using the laser light sources of the first to third embodiments, the waveform deterioration can be suppressed as shown in FIG. 16.

Conventionally, it has been necessary to control a current value lest the waveform of the light output should become a wedge-shaped waveform. However, by using the laser light source having the construction proposed in the present application, it becomes unnecessary to control the current value and power consumption can be reduced.

Figure 14:
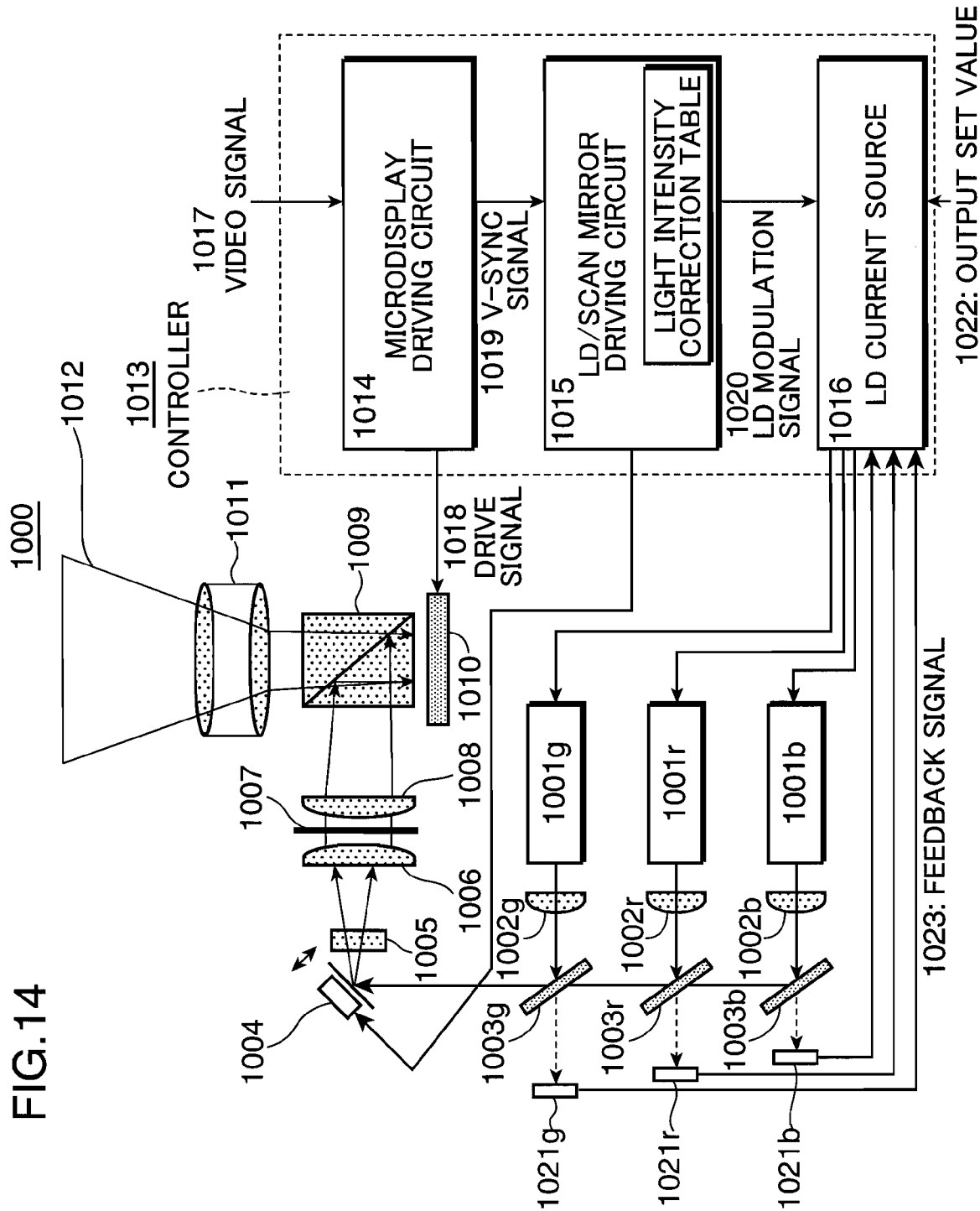
FIG. 14 is a diagram showing an example of a 2D image display device in the case of adopting the wavelength converter of the invention and performing a field sequential operation using only one 2D modulation element.

Next, a construction example of a projector using only one 2D modulation element is shown in FIG. 14.

In FIG. 14 is shown a case where a ferroelectric element LCOS is used as the 2D modulation element.

Laser beams emitted from a red laser light source 1001r, a green laser light source 1001g and a blue laser light source 1001b are collimated into parallel beams by collimator lenses 1002r, 1002g and 1003b. Mirrors 1003r, 1003g and 1003b are dielectric multilayer mirrors respectively having reflection characteristics in a red region (wavelength of 600 nm or longer), a blue region (wavelength of 400 nm (inclusive) to 460 nm (inclusive)) and a green region (wavelength of 520 nm (inclusive) to 560 nm (inclusive)). The lenses 1002r, 1002g and 1002b and the mirrors 1003r, 1003g and 1003b are adjusted such that the beam paths of the red, green and blue light sources are coaxial after the reflections by the mirrors 1003r, 1003g and 1003b. A scan mirror 1004 functions to scan the beam in a specified scan direction. A shaping lens 1005 is a cylindrical lens. The shaping lens 1005 is for shaping the beam from the scan mirror 1004 into a linear emission line spreading in a direction normal to the scan direction. Lens 1006 is a relay lens. Lens 1008 is a field lens. A diffuser plate 1007 is arranged between the relay lens 1006 and the field lens 1008 and adapted to further shape the beam, which was shaped into the linear emission line by the cylindrical lens 1005, into a strip-like beam. A polarizing prism 1009 is a polarization beam splitter. Identified by 1010 is a ferroelectric liquid crystal device (LCOS). Since the LCOS 1010 is turned on and off by rotating the polarization direction of the beam, the polarizing prism 1009 needs to be a polarization beam splitter. The blue, red and green beams are multiplexed, and the resulting multiplexed beam has the optical path scanned by the scan mirror 1004 and is incident on the polarizing prism 1009 as an S-polarized beam. Since a reflection film in the prism 1009 is designed to reflect the S-polarized beam, the S-polarized beam illuminates the LCOS 1010.

The controller 1013 includes a microdisplay driving circuit 1014, an LD/scan mirror driving circuit 1015 and an LD current source 1016. The microdisplay driving circuit 1014 receives a video signal 1017 and generates drive signals 1018. The LD/scan mirror driving circuit 1015 generates the driving waveform of the scan mirror and an emission trigger representing the emission timing of the laser, using a V-SYNC signal 1019 as one of the drive signals 1018 as a trigger. The LD current source 1016 receives the emission trigger and supplies a current to the laser in synchronism with this signal of the emission trigger. The V-SYNC signal 1019 is a pulse signal of 60 Hz. In accordance with this V-SYNC signal 1019, the microdisplay driving circuit 1014 generates a laser emission signal of 120 Hz in the case of 2x-speed. In other words, a signal of n·60 Hz is generated in the case of nx-speed. A duty ratio (turn-on period/(turn-on period+turn-off period)) determining a laser emission time is suitably determined according to a driving method for the 2D modulation element. Further, outputs of the red, green and blue lasers 1001r, 1001g and 1001b are monitored by photodetectors 1021r, 1021g and 1021b, and feedbacks are given to the LD current source 1016. The LD current source 1016 makes the emission intensities of the respective lasers uniform by comparing the products of an LD modulation signal 1020 and LD output set values 1022 with monitor signals from the photodetectors 1021r, 1021g and 1021b.

In the display application as above, the respective light sources 1001r, 1001g and 1001b are pulse-driven in some cases at the time of changing colors upon performing a light quantity control and a field sequential control. In such cases, peak outputs of the respective light sources 1001r, 1001g and 1001b need to be set according to the duty ratios (turn-on period/(turn-on period+turn-off period)). At this time, in a light source using a fiber laser with a conventional construction, the heat generated by a fiber cannot be efficiently radiated upon increasing a peak output, thereby causing problems of reducing the efficiency and restricting an upper limit of the light output in addition to the above-described problem of drooping. Since the problems resulting from the heat generation of the fiber such as an efficiency reduction and an output restriction can be solved by using the construction of the present application, the effect of improving the efficiency can be obtained even if the construction of the present application is applied as a light source for a full color display using one 2D modulation element such as an LCOS or a DMD that necessitates a field sequential drive.

Besides the 2D image display devices having the above constructions, a mode for projecting light from behind a screen (rear projection display) can be adopted.

By adopting a construction to illuminate a liquid crystal panel with lights of three primary colors R, G and B from behind the panel, the wavelength conversion light source can also be used as a backlight source of a liquid crystal display.

Although spatial modulation elements made of a transmissive liquid crystal or a reflective liquid crystal are used in FIGS. 13 and 14, it is, of course, also possible to use 2D modulation elements using a galvanometer mirror or a mechanical micro switch (MEMS) represented by a DMD.

In the case where a harmonic is introduced to a light modulation element (reflective spatial modulation element, MEMS, or galvanometer mirror) having a light modulation characteristic little influenced by polarization components by an optical fiber as in this embodiment, the optical fiber needs not be a polarization maintaining fiber (PANDA fiber or the like). On the other hand, in the case of using a 2D modulation device made of a liquid crystal, it is preferable to use a polarization maintaining fiber as the optical fiber for transmitting the harmonic since the influence of polarization components on a modulation characteristic is large in this 2D modulation device.

Although the fiber lasers used in the first to third embodiments are doped with Yb or Pr as a rare-earth element, other rare-earth elements, e.g. at least one rare-earth element selected from Nd, Er, Dy, Tb, Eu, Ce, Tm, Ho, Gd, Y, La and the like may be used. It is also possible to change a doped amount of the rare-earth element and to dope a plurality of rare-earth elements according to the wavelength and output of the wavelength converter. Particularly, Nd and Yb are notably subject to a phenomenon of absorbing the generated light and reducing the oscillation efficiency by heat generated thereby, wherefore it is preferable to adopt the heat radiating structure of the present application.

Although the lasers having a wavelength of 915 nm and a wavelength of 976 nm are used as the excitation laser light sources of the fiber lasers in the first to third embodiments, any laser light source having a wavelength other than the above wavelengths may be used provided that it can excite the fiber laser.

Although a periodically poled MgO:LiNbO is used as the wavelength conversion element in the first to third embodiments, a wavelength conversion element made of another material and/or having another structure, e.g. potassium titanyl phosphate (KTP), Mg:LiTaO$_3$ or the like having a periodically poled structure may be used.

The aforementioned specific embodiments mainly embrace inventions having the following constructions.

In order to accomplish the above object, a wavelength converter of the present invention comprises a fiber laser resonator including a fiber containing an laser-active material and a fiber grating formed in the fiber; a laser light source for emitting an excitation light to the fiber; and a wavelength conversion element for converting a fundamental wave of a laser beam emitted from the fiber laser resonator into a harmonic, wherein the fiber containing the laser-active material is coiled; and at least a part of the outer surface of the fiber includes a reflection surface for reflecting light having the wavelength of the excitation light and is covered by a heat radiating member capable of radiating heat generated by the fiber.

According to the above wavelength converter, since the heat of the fiber is smoothly radiated by the heat radiating member, a conversion efficiency from the excitation light to an oscillating light by the laser light source can be improved. By this improvement of the conversion efficiency, a harmonic having a desired output can be obtained with less excitation light and the output of the laser beam obtained from a unit applied power can be increased.

Also in the case of obtaining a large fundamental wave by using the fiber laser in the wavelength converter, there can be realized a high-efficiency and high-output visible laser light source whose conversion efficiency from the excitation light to the oscillating light is unlikely to decrease.

According to the wavelength converter of the present invention, the life of the entire device can be extended and the reliability thereof can be improved since the quantity of the excitation light emitted to obtain the same light output can be reduced as compared to the prior art.

Further, in the above construction, the outer surface of the fiber containing the laser-active material is covered by the heat radiating member and this heat radiating member has the reflection surface for reflecting the excitation light. Thus, the excitation light radiated from the fiber containing the laser-active material can be reutilized.

In the above wavelength converter, the heat radiating member is preferably made of a sheet-like metal.

In this construction, a part of the excitation light radiated to the outside of the fiber can be reutilized by winding the sheet-like metal on the outer surface of the fiber.

In the above wavelength converter, the heat radiating member is preferably made of metal and coated on the outer surface of the fiber.

According to this embodiment, the heat radiating member can be easily provided on the outer surface of the fiber using a known deposition apparatus or the like.

In the above wavelength converter, the fiber is preferably accommodated between a pair of resin films bonded by compression while being held on a heat transfer sheet.

According to this construction, the fiber can be easily handled since being accommodated between the pair of resin films.

In addition, by vacuum packaging the fiber between the respective resin films, the fiber can be more easily handled and the adhesion of the heat radiating member and the fiber can be improved to enable more efficient heat radiation.

Also in the case of obtaining a large fundamental wave by using the fiber laser having this construction in the wavelength converter, the efficiency does not decrease and a high-efficiency and high-output visible laser light source can be realized.

In the above wavelength converter, a part of the heat transfer sheet is preferably arranged outside the pair of resin films.

According to this construction, heat generated by the fiber can be radiated at a position outside the respective resin sheets via the heat transfer sheet.

In the above wavelength converter, it is preferable that the cladding diameter of the fiber is from 120 µm (inclusive) to 130 µm (inclusive); and that the core diameter thereof is 12 µm or shorter.

It is also preferable that the cladding diameter of the fiber is 120 µm (inclusive) to 130 µm (inclusive); that the fiber is coiled to have a diameter of 10 cm or shorter; and that the core diameter thereof is 10 µm or shorter.

Specifically, a conversion efficiency from an excitation light to an oscillating light increases as the core diameter of the fiber increases. However, if the core diameter exceeds 12 µm when the cladding diameter of the fiber is 120 µm (inclusive) to 130 µm (inclusive), a single mode cannot be maintained. Thus, the core diameter of the fiber needs to be 12 µm or shorter. Further, if the fiber is coiled to have a diameter of 10 cm, the core diameter needs to be 10 µm or shorter in order to maintain the single mode.

Here, Yb ions or Nd ions absorb the generated light to generate heat and a phenomenon of reducing an oscillation efficiency by the self-generated heat obviously appears. Thus, in the above wavelength converter, the fiber particularly preferably contains Yb ions or Nd ions as the laser-active material.

In the above wavelength converter, it is preferable that the oscillation wavelength of the laser light source is 900 nm (inclusive) to 980 nm (inclusive); and that the heat radiating member is made of metal containing aluminum or gold.

In other words, aluminum or gold is unlikely to absorb the excitation light having a wavelength of 900 nm (inclusive) to 980 nm (inclusive). Thus, by using the metal containing aluminum or gold as the heat radiating member, the conversion efficiency from the excitation light to the oscillating light can be improved by reducing the loss of the excitation light.

In the above wavelength converter, it is preferable that the oscillation wavelength of the laser light source is 450 nm (inclusive) to 980 nm (inclusive); and that the heat radiating member is made of metal containing aluminum.

In other words, aluminum is unlikely to absorb the excitation light having a wavelength of 450 nm (inclusive) to 980 nm (inclusive). Thus, by using the metal containing aluminum as the heat radiating member, the conversion efficiency from the excitation light to the oscillating light can be improved by reducing the loss of the excitation light.

In the above wavelength converter, it is preferable that the fiber includes a core, a cladding provided on the outer side of the core and a coating film provided on the outer side of the cladding; and that the heat radiating member is provided on the outer side of the coating film.

According to this construction, since the heat radiating member is provided on the outer side of the coating film of the fiber, optical characteristics of the core and the cladding can be maintained and the heat radiating member can be fixed to the fiber with improved strength for the following reason.

In the case of providing the fiber with the heat radiating member, it may be also thought to fix the heat radiating member to the outer surface of the cladding. Here, if the heat radiating member is directly fixed to the outer surface of the cladding, the refractive index of the cladding itself does not change, but a transmission refractive index of light propagating in this cladding increases, leading to a likelihood that the light leaks out from the fiber. On the other hand, since the heat radiating member is fixed to the outer surface of the coating film in the above construction, the light trying to leak out can be reutilized by being reflected by the heat radiating member outside the coating film while the optical characteristics of the core and the cladding are stably maintained by the structure up to the coating film.

Further, in the case of directly fixing the heat radiating member to the outer surface of the cladding, the outer surface of the cladding cannot be worked to improve the fixing strength of the heat radiating member on the cladding in consideration of influences given to the optical characteristics. On the contrary, there is little influence the outer surface of the coating film gives to the optical characteristics. Therefore, the outer surface of the coating film can be worked to improve the fixing strength of the heat radiating member on the coating film.

In the above wavelength converter, the heat transfer sheet is preferably made of layered graphite.

According to this construction, the heat generated by the fiber can be smoothly radiated due to a small heat resistance of the layered graphite.

In the above wavelength converter, it is preferable that a temperature compensating mechanism for suppressing a dimensional change of the fiber in longitudinal direction resulting from a temperature change is further provided; and that the temperature compensating mechanism is located at a position corresponding to the fiber grating.

According to this construction, a variation of the refractive index of the fiber grating resulting from the temperature change can be suppressed by suppressing the dimensional change of the fiber in longitudinal direction resulting from the temperature change. For example, a variation of the oscillation wavelength by the fiber grating can be suppressed to 0.05 nm/° C. by suppressing the variation of the refractive index of the fiber grating using a bimetal or a ceramic material having a negative thermal expansion coefficient.

In the above wavelength converter, a coiled part of the fiber is preferably accommodated between the respective resin films while being arranged in a groove formed in the heat transfer sheet.

According to this construction, the fiber can be positioned relative to the heat transfer sheet by arranging the coiled part of the fiber in the groove of the heat transfer sheet. Accordingly, a displacement of the fiber can be suppressed when the heat transfer sheet is sandwiched between the pair of resin films.

In the above wavelength converter, a heat sink is preferably provided in a part of the heat transfer sheet arranged outside the pair of resin films.

According to this construction, the heat of the fiber can be more efficiently radiated by providing the heat sink in the part of the heat transfer sheet arranged outside the respective resin films.

In the above wavelength converter, the heat radiating member coated on the fiber is preferably accommodated between the pair of resin films bonded to each other by compression while being held on the heat transfer sheet.

According to this construction, the heat radiated from the heat radiating member can be introduced to a desired position via the heat transfer sheet while the heat generated by the fiber is radiated and the excitation light is reutilized by the coated heat radiating member.

Specifically, the heat generated by the fiber can be introduced to the outside of the pair of resin films and radiated by arranging a part of the heat transfer sheet outside the respective resin films.

In the above wavelength converter, a heat sink is preferably provided in a part of the heat transfer sheet arranged outside the pair of resin films.

By so doing, heat can be more efficiently radiated via the heat transfer sheet and the heat sink.

The above wavelength converter may be constructed to emit a green laser beam having a wavelength of 515 nm (inclusive) to 540 nm (inclusive). Since a green laser output beam having a high luminosity factor can be obtained by this construction, color representation closer to original colors can be realized by using this wavelength converter in a display or the like having good color reproducibility.

If the above wavelength converter is constructed to emit yellow green to orange laser beams having wavelengths of 540 nm (inclusive) to 600 nm (inclusive), a laser light source efficient in the medical application or as a laser for physical and chemical experiments can be obtained.

In the above wavelength converter, the wavelength of a fundamental wave laser beam emitted from the fiber laser resonator may be 1030 nm (inclusive) to 1200 nm (inclusive); and the output of the fundamental wave laser beam may be 7 W or larger.

In order to accomplish the above object, a 2D image display device of the present invention comprises the above wavelength converter; and a mechanism for controlling a light quantity in accordance with the luminance information of an inputted video signal, wherein an average light quantity is controlled by applying a PWM control to a light source.

The 2D image display device of the present invention using the wavelength converter having the above features has profound effects of enabling a thinner configuration, higher efficiency and lower power consumption in addition to high luminance, a wide color reproduction range and high image quality.

In order to accomplish the above object, another 2D image display device of the present invention comprises a screen, a plurality of laser light sources and a scan unit for scanning the laser light sources, wherein the laser light sources include at least light sources for emitting red, green and blue beams; and any one of the above wavelength converters is used at least as the green one of the laser light sources.

Since a green laser output beam having a high luminosity factor can be obtained by this construction, color representation closer to original colors can be realized by using this wavelength converter in a display or the like having good color reproducibility.

There can be also provided a 2D image display device comprising the above wavelength converter; and a single 2D modulation element, wherein red, green and blue colors are successively switched and displayed in accordance with a V-SYNC signal of a video signal.

Since the wavelength converters and the 2D image display devices of the present invention have high luminance, a wide color reproduction range and lower power consumption, they are useful in the field of displays such as large-size displays and high-luminance displays.

This application is based on Japanese Patent Application No. 2007-020831 filed in Japan, the contents of which are hereby incorporated by references.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A wavelength converter, comprising:
   a fiber laser resonator including a fiber containing a laser-active material and a fiber grating formed in the fiber;
   a laser light source for emitting an excitation light to the fiber; and
   a wavelength conversion element for converting a fundamental wave of a laser beam emitted from the fiber laser resonator into a harmonic,
   wherein:
   the fiber containing the laser-active material is coiled; and
   at least a part of the outer surface of the fiber includes a reflection surface for reflecting light having the wavelength of the excitation light and is covered by a heat radiating member that radiates heat generated by the fiber.

2. A wavelength converter according to claim 1, wherein the heat radiating member is made of a sheet of metal.

3. A wavelength converter according to claim 1, wherein the heat radiating member is made of metal and is coated on the outer surface of the fiber.

4. A wavelength converter according to claim 3, further comprising:
   a pair of resin films bonded to each other by compression; and
   a heat transfer sheet;
   wherein the heat radiating member coated on the fiber is accommodated between the pair of resin films and is held on the heat transfer sheet.

5. A wavelength converter according to claim 4, wherein a part of the heat transfer sheet is arranged outside the pair of resin films.

6. A wavelength converter according to claim 5, further comprising a heat sink provided in a part of the heat transfer sheet arranged outside the pair of resin films.

7. A wavelength converter according to claim 1, further comprising:
   a pair of resin films bonded to each other by compression; and
   a heat transfer sheet;
   wherein the fiber is accommodated between the pair of resin films and is held on the heat transfer sheet.

8. A wavelength converter according to claim 7, wherein a part of the heat transfer sheet is arranged outside the pair of resin films.

9. A wavelength converter according to claim 8, further comprising a heat sink provided in a part of the heat transfer sheet arranged outside the pair of resin films.

10. A wavelength converter according to claim 7, wherein the heat transfer sheet is made of layered graphite.

11. A wavelength converter according to claim 7, wherein the heat transfer sheet has a groove, and the fiber includes a coiled part which is accommodated between the resin films and which is arranged in the groove.

12. A wavelength converter according to claim 1, wherein:
    the fiber has a cladding diameter from 120 μm (inclusive) to 130 μm (inclusive) and a core diameter of 12 μm or shorter.

13. A wavelength converter according to claim 1, wherein:
    the fiber has a cladding diameter from 120 μm (inclusive) to 130 μm (inclusive) and a core diameter of 10 μm or shorter; and
    the fiber is coiled to have a diameter of 10 cm or shorter.

14. A wavelength converter according to claim 1, wherein the fiber contains Yb ions or Nd ions as the laser-active material.

15. A wavelength converter according to claim 1, wherein:
    an oscillation wavelength of the laser light source is 900 nm (inclusive) to 980 nm (inclusive); and
    the heat radiating member is made of metal containing aluminum or gold.

16. A wavelength converter according to claim 1, wherein:
    an oscillation wavelength of the laser light source is 450 nm (inclusive) to 980 nm (inclusive); and
    the heat radiating member is made of metal containing aluminum.

17. A wavelength converter according to claim 1, wherein:
    the fiber includes a core, a cladding provided on the outer side of the core and a coating film provided on the outer side of the cladding; and
    the heat radiating member is provided on the outer side of the coating film.

18. A wavelength converter according to claim 1, further comprising a temperature compensating mechanism for suppressing a dimensional change of the fiber in longitudinal, direction result from a temperature change, wherein the temperature compensating mechanism is located at a position corresponding to the fiber grating.

19. A 2D image display device, comprising:
    the wavelength converter according to claim 1;
    a mechanism for controlling a light quantity in accordance with luminance information of an inputted video signal, and controlling an average light quantity by applying a Pulse Width Modulation (PWM) control to a light source.

* * * * *